United States Patent [19]
Park et al.

[11] 4,047,794
[45] Sept. 13, 1977

[54] OPTICAL RELAY FOR A MICROSCOPE AND A BACK APERTURE VIEWER THEREFOR

[75] Inventors: Ernest D. Park, Clarence; Joseph C. Dianetti, East Aurora, both of N.Y.

[73] Assignee: American Optical Corporation, Southbridge, Mass.

[21] Appl. No.: 737,743

[22] Filed: Nov. 1, 1976

Related U.S. Application Data

[62] Division of Ser. No. 656,763, Feb. 9, 1976.

[51] Int. Cl.² .............................................. G02B 21/06
[52] U.S. Cl. ....................................... 350/54; 350/12; 350/14
[58] Field of Search .............................. 350/54, 47–50, 350/34, 10–14

[56] References Cited

U.S. PATENT DOCUMENTS

| | | | |
|---|---|---|---|
| 3,628,848 | 12/1971 | Nomarski | 350/12 |
| 3,672,778 | 6/1972 | Kern | 350/54 |
| 3,712,702 | 1/1973 | Schmidt | 350/54 |
| 3,924,926 | 12/1975 | Merstallinger et al. | 350/34 |

*Primary Examiner*—Jon W. Henry
*Attorney, Agent, or Firm*—Alan H. Spencer; William C. Nealon; H. R. Berkenstock, Jr.

[57] ABSTRACT

A relay lens system for use with a microscope to provide a station having a location optically equivalent to the back focal plane of the microscope objective is improved by using two identical lens components having different front and back focal lengths and arranged on the optical axis with opposite axial orientations. A back aperture viewer may be selectively positioned on the optical axis for viewing an optical element at said station.

2 Claims, 1 Drawing Figure

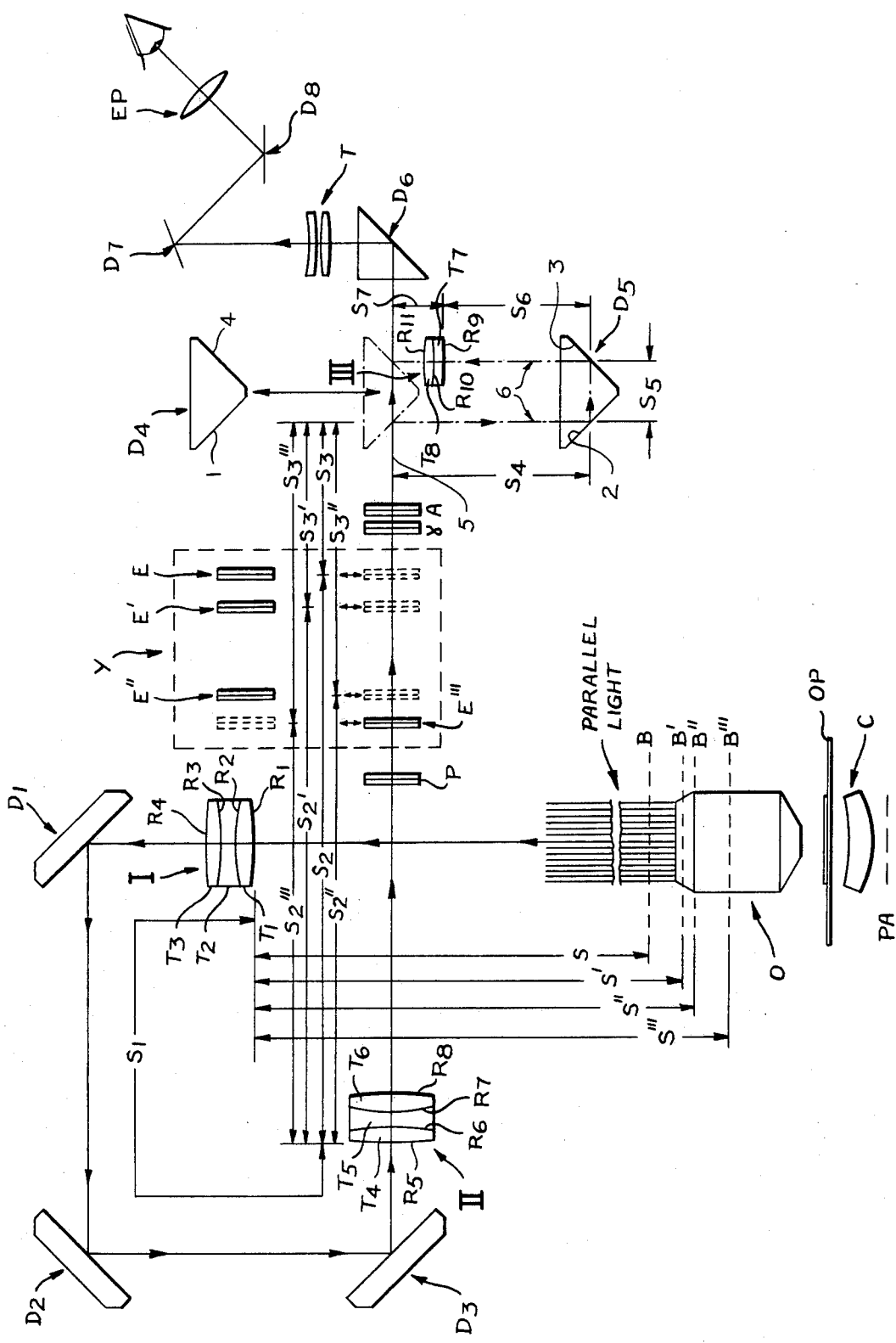

OPTICAL RELAY FOR A MICROSCOPE AND A BACK APERTURE VIEWER THEREFOR

This is a division of application Ser. No. 656,763 filed Feb. 2, 1976.

BACKGROUND OF THE INVENTION

This invention relates to an improved microscope optical relay system and back aperture viewer. More particularly, this invention relates to a relay system including two identical optical components having different front and back focal lengths with one component axially arranged opposite the other. This invention also is directed further to a back aperture viewer for observing optical elements located in a station at a location optically equivalent to the back focal plane of a microscope objective.

A number of microscopy techniques require positioning an optical element either at or very near the back focal plane of a microscrope objective. Difficulties are encountered in many objectives, particularly those of higher power, because the back focal plane is located within the physical structure of the objective. Often, the back focal plane is located within a glass lens element. U.S. Pat. No. 3,628,848 issued to Georges Nomarski on Dec. 21, 1971 describes certain microscopy techniques in which it is desirable to locate an optical element in the back focal plane of the microscope objective. Nomarski also notes that, because of the inaccessability of the back focal plane, it may be desirable to use a relay providing a remote station in which such optical elements can be located in a position optically equivalent to the back focal plane of the objective. Optical elements of the type desirable to locate in such a station are described in commonly owned co-pending application Ser. No. 594,989, filed July 11, 1975.

It is an object of the present invention to provide an optical relay for obtaining a remote station optically equivalent to the back focal plane of a microscrope objective.

It is a further object of the present invention to provide such a relay without introducing significant aberrations of the of the object image.

It is a still further object of the present invention to provide a viewer for selectively observing the positioning of an optical element at such a remote station.

BRIEF DESCRIPTION OF THE INVENTION AND DRAWINGS

The present invention is directed to an optical relay for providing a remote station having a location optically equivalent to the back aperture plane of a microscope objective without introducing aberrations or distortions of the object image observed through the eyepiece. The relay system includes two identical lens components having different front and back focal planes which are positioned on the optical axis of the relay in opposing axial orientation. The differing focal length can be obtained by either having different radii of curvature on each of the external surfaces or in the case of doublets and triplets on the internal surfaces.

The back aperture viewer includes a means selectively positionable on the optical axis to deflect light passing between the remote station and the eyepiece through a lens located along an alternate axis. After the light has passed through the lens, it is redirected along the original optical axis. Thus, when one desires to observe the position of an optical element located in the remote station, the deflector is selectively positioned on the optical axis and the lens on the alternate axis focuses an image of the optical element in the focal plane of the eyepiece.

FIG. 1 is an optical diagram of the relay system and back aperture viewer according to the present invention.

DETAIL DESCRIPTION OF THE PRESENT INVENTION

Diagrammatically, a microscope having four objectives O with back focal planes B, B', B" and B''', respectively, is aligned on an optical axis with relay component I. Light passing through component I is deflected by mirrors $D_1$, $D_2$ and $D_3$ through a second lens component II to provide a station Y having optically equivalent locations E, E', E" and E''' to the respective back focal planes B, B', B" and B'''. In normal use, light leaving the station Y passes through the remainder of the microscope to eyepiece E. Polarizer P, quarter wave plate γ and analyzer A are conventional optical elements for microscopy techniques such as those taught by Nomarski or Osterberg et al. in U.S. Pat. No. 2,516,905.

Lens components I and II are identical elements but of opposite axial orientation. Preferably, lens components I and II are identical triplets having different front and back focal lengths. The parameters of these lenses and their spacings, relative to the back focal plane, each other and the optical element positioned at the remote optically equivalent station are set forth in Table I with axial spacings designated S to $S_2$, lens radii designated $R_1$ to $R_8$, wherein a minus sign (−) applies to surfaces whose center of curvature lies on the back focal plane side of their vertices, and lens thicknesses designated $T_1$ to $T_6$. All radii, spacings and thicknesses being in millimeters. The refractive indices and Abbe numbers of the glasses in the successive lenses are designated $ND_1$ to $ND_6$ and $v_1$ to $v_6$.

TABLE I

| Lens | Radius | Thickness | Spacing | Index of Refraction | Abbe Number |
|---|---|---|---|---|---|
| | | | S = 149.09 | | |
| | | | S' = 156.50 | | |
| | | | S" = 158.52 | | |
| | | | S''' = 166.42 | | |
| | $R_1$ = 128.461 | | | | |
| | | $T_1$ = 5.22 | | $ND_1$ = 1.54739 | $v_1$ = 53.63 |
| | $R_2$ = −59.123 | | | | |
| I | | $T_2$ = 4.00 | | $ND_2$ = 1.65332 | $v_2$ = 39.71 |
| | $R_3$ = 83.524 | | | | |
| | | $T_3$ = 4.30 | | $ND_3$ = 1.65844 | $v_3$ = 50.88 |
| | $R_4$ = 175.509 | | | | |
| | | | $S_1$ = 327.11 | | |
| | $R_5$ = 175.509 | | | | |
| | | $T_4$ = 4.30 | | $ND_4$ = 1.65884 | $v_4$ = 50.88 |

TABLE I-continued

| Lens | Radius | Thickness | Spacing | Index of Refraction | Abbe Number |
|---|---|---|---|---|---|
| II | $R_6 = -83.524$ | | | | |
| | | $T_5 = 4.00$ | | $ND_5 = 1.65332$ | $\nu_5 = 39.71$ |
| | $R_7 = 59.123$ | | | | |
| | | $T_6 = 5.22$ | | $ND_6 = 1.54739$ | $\nu_6 = 53.63$ |
| | $R_8 = -128.461$ | | | | |
| | | | $S_2 = 177.85$ | | |
| | | | $S_2' = 170.60$ | | |
| | | | $S_2'' = 168.44$ | | |
| | | | $S_2''' = 161.22$ | | |

The microscopy techniques noted above require precision positioning of optical elements E, E', E" and E''' in their respective locations in the station. Note that they are to be properly aligned with the image of an optical element PA, such as taught by Nomarski and Osterberg et al. located in the front focal plane of condenser C. In order to perform the positioning of optical elements E, E', E" and E''' without removing eyepieces EP, it is necessary to use a selectively operable viewing system adpated to image each respective optical element in the eyepiece focal plane. Deflector 4 is selectively positionable on the optical axis to provide an alternate axis 6 by virtue of reflecting surface 1. A prism with reflective surfaces 2 and 3 returns the alternate axis toward observation axis 5 between reflective surface 3 and the second reflective surface 4 of deflective $D_4$ through axially-slideable focusing lens III. Reflective surface 4 returns the alternate axis to the path of the observation axis. Lens III is axially slidable to permit selective positioning for focusing an image of a chosen one of optical elements E, E', E" and E''' in eyepiece EP. Deflectors 7 and 8 do not form a part of the present invention and with telescope T usually are a part of the eyepiece body of a microscope without the relay system of the present invention. Deflector 6 is used to introduce light passing across observation axis 5 into the eyepiece body through telescope T.

Focusing lens III is a biconvex doublet comprising a meniscus-shaped singlet and cemented to a biconvex singlet. The parameters of the viewing system with axial spaces being designated $S_3$ to $S_7$, lens radii being designated $R_9$ to $R_{11}$, wherein a minus sign (—) indicates a center of curvature on the optical element side of the lens, lens thicknesses designated $T_7$ and $T_8$, indices of refraction and Abbe numbers are absolute values designated $ND_7$, $ND_8$, $\nu_7$, and $\nu_8$, respectively, are determined by the following relationship.

| Lens | Radius | Thickness | Space | Index of Refraction | Abbe Number |
|---|---|---|---|---|---|
| | | | $S_3 = 32.00$ | | |
| | | | $S_3' = 39.25$ | | |
| | | | $S_3'' = 41.41$ | | |
| | | | $S_3''' = 48.63$ | | |
| | | | $S_4 = 56.05$ | | |
| | | | $S_5 = 17.30$ | | |
| | | | $S_6 = 9.57$ to 41.57 | | |
| | $R_9 = 609.60$ | | | | |
| III | | $T_7 = 2.00$ | | $ND_7 = 1.61633$ | $\nu_7 = 31.0$ |
| | $R_{10} = 49.49$ | | | | |
| | | $T_8 = 2.90$ | | $ND_8 = 1.52047$ | $\nu_8 = 69.7$ |
| | $R_{11} = -59.96$ | | | | |
| | | | $S_7 = 46.48$ to 14.48 | | | wherein all radii thicknesses are in millimeters.

It will be apparent that the foregoing values are variable. Other forms are thus possible and changes may be made in the values of the constructional data named without departing from the spirit of this invention.

The apparent excess precision implied by the large number of decimal places is somewhat fictitious for a number of reasons. For instance, varying radii (larger in particular) by several millimeters would produce only minimal changes, mostly in focal length. Variations in thicknesses of point 1 to point 2mm would not adversely affect performance. In fact, large regions of design exist (assuming that radii and thicknesses are properly balanced).

What is claimed is:

1. In a microscope having an observation system including in optical alignment along an axis, an objective, a telescope lens and an eyepiece, said objective having a back focal plane and said eyepiece having an image plane, a relay lens system to relay said back focal plane to an optically equivalent location in a station positioned between said objective and said telescope lens and an optical element at said station selectively positionable in said location for rendering said optical element operable in a manner equivalent to being positioned in said back focal plane, the improvement comprising a viewer selectively positionable on said axis between said station and said eyepiece for observing said optical element, an additional lens, said viewer including first means to deflect said axis to an alternate path passing through said additional lens, said lens being adapted to focus an image of said optical element in said eyepiece image plane, second means to deflect said alternate path after said lens along said axis and focusing means to move said additional lens axially along said alternate path.

2. The improvement of claim 1 wherein said first means includes first, second and third deflectors and said second means is a fourth deflector and the optical parameters of axial spaces, from said optical element to said fourth deflector ($S_3$ to $S_7$), lens radii ($R_9$ to $R_{11}$), wherein a minus sign (—) indicates a center of curvature on the optical element side of the lens, lens thicknesses ($T_7$ and $T_8$), indices of refraction ($ND_7$ and $ND_8$)

and Abbe numbers ($\nu_7$ and $\nu_8$) of said additional lens are determined by the following relationship, all radii, thicknesses and spaces being in millimeters

| Lens | Radius | Thickness | Space | Index of Refraction | Abbe Number |
|---|---|---|---|---|---|
|  |  |  | $S_3 = 32.00$ |  |  |
|  |  |  | $S_3' = 39.25$ |  |  |
|  |  |  | $S_3'' = 41.41$ |  |  |
|  |  |  | $S_3''' = 48.63$ |  |  |
|  |  |  | $S_4 = 56.05$ |  |  |
|  |  |  | $S_5 = 17.30$ |  |  |
|  |  |  | $S_6 = 9.57$ to 41.57 |  |  |
| III | $R_9 = 609.60$ | $T_7 = 2.00$ |  | $ND_7 = 1.61633$ | $\nu_7 = 31.0$ |
|  | $R_{10} = 49.49$ | $T_8 = 2.90$ |  | $ND_8 = 1.52047$ | $\nu_8 = 69.7$ |
|  | $R_{11} = -59.96$ |  | $S_7 = 46.48$ to 14.48 |  |  |

* * * * *